(12) United States Patent
Jagadeesan et al.

(10) Patent No.: US 7,870,590 B2
(45) Date of Patent: Jan. 11, 2011

(54) SYSTEM AND METHOD FOR FAST START-UP OF LIVE MULTICAST STREAMS TRANSMITTED OVER A PACKET NETWORK

(75) Inventors: Ramanathan T. Jagadeesan, San Jose, CA (US); Kristen Marie Robins, San Jose, CA (US); Bich Tu Nguyen, Los Altos, CA (US); Fang Wu, Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 1092 days.

(21) Appl. No.: 10/969,113

(22) Filed: Oct. 20, 2004

(65) Prior Publication Data

US 2006/0083263 A1 Apr. 20, 2006

(51) Int. Cl.
*H04N 7/173* (2006.01)
*H04L 12/28* (2006.01)
*H04L 12/56* (2006.01)
*H04H 20/28* (2008.01)

(52) U.S. Cl. .............................. 725/93; 725/94; 725/95; 725/146; 370/390; 370/487

(58) Field of Classification Search .................. 725/86, 725/90

See application file for complete search history.

(56) References Cited

U.S. PATENT DOCUMENTS

| 5,483,587 | A |   | 1/1996  | Hogan et al.        |
|-----------|---|---|---------|---------------------|
| 5,600,366 | A |   | 2/1997  | Schulman            |
| 5,673,253 | A |   | 9/1997  | Shaffer             |
| 5,729,687 | A |   | 3/1998  | Rothrock et al.     |
| 5,963,217 | A |   | 10/1999 | Grayson et al.      |
| 6,034,746 | A | * | 3/2000  | Desai et al. ............ 375/240.26 |
| 6,065,050 | A | * | 5/2000  | DeMoney ................... 709/219 |
| 6,137,834 | A | * | 10/2000 | Wine et al. .................. 375/240 |
| 6,141,324 | A |   | 10/2000 | Abbott et al.       |

(Continued)

FOREIGN PATENT DOCUMENTS

EP    1 553 735 A1    7/2005

(Continued)

OTHER PUBLICATIONS

H. Schulzrinne, et al. "RTP: A Transport Protocol for Real-Time Applications." Internet Engineering Task Force, RFC 3550. Jul. 2003. <http://www.ietf.org/rfc/rfc2778>.*

(Continued)

*Primary Examiner*—Brian T Pendleton
*Assistant Examiner*—Ryan Stronczer
(74) *Attorney, Agent, or Firm*—The Law Offices of Bradley J. Bereznak

(57) ABSTRACT

A system for multicast streaming of programs over a packet network includes a node having a processor that conditions a video bitstream such that packets containing an I-frame are located near program specific information (PSI) packets, the processor marking a random join point (RJP) in the video bitstream immediately preceding the I-frame and PSI packets, the node outputting the conditioned and marked video bitstream across the packet network. An edge device of the network includes a buffer that caches packets of the conditioned and marked video bitstream video starting at the RJP, and sends the cached packets to a client receiver.

13 Claims, 6 Drawing Sheets

U.S. PATENT DOCUMENTS

| | | | |
|---|---|---|---|
| 6,151,636 A * | 11/2000 | Schuster et al. | 709/247 |
| 6,236,854 B1 | 5/2001 | Bradshaw | |
| 6,332,153 B1 | 12/2001 | Cohen | |
| 6,501,739 B1 | 12/2002 | Cohen | |
| 6,570,926 B1 * | 5/2003 | Agrawal et al. | 375/240.27 |
| 6,608,820 B1 | 8/2003 | Bradshaw | |
| 6,624,841 B1 | 9/2003 | Buchner et al. | |
| 6,643,496 B1 | 11/2003 | Shimoyama et al. | |
| 6,650,652 B1 | 11/2003 | Valencia | |
| 6,671,262 B1 | 12/2003 | Kung et al. | |
| 6,675,216 B1 | 1/2004 | Quatrano et al. | |
| 6,721,290 B1 * | 4/2004 | Kondylis et al. | 370/329 |
| 6,735,572 B2 | 5/2004 | Landesmann | |
| 6,744,785 B2 * | 6/2004 | Robinett et al. | 370/486 |
| 6,771,644 B1 * | 8/2004 | Brassil et al. | 370/390 |
| 6,775,247 B1 | 8/2004 | Shaffer et al. | |
| 6,816,469 B1 | 11/2004 | Kung et al. | |
| 6,865,540 B1 | 3/2005 | Faber et al. | |
| 6,876,734 B1 | 4/2005 | Summers et al. | |
| 6,925,068 B1 | 8/2005 | Stanwood et al. | |
| 6,931,001 B2 | 8/2005 | Deng | |
| 6,931,113 B2 | 8/2005 | Ortel | |
| 6,937,569 B1 | 8/2005 | Sarkar et al. | |
| 6,947,417 B2 | 9/2005 | Laursen et al. | |
| 6,956,828 B2 | 10/2005 | Simard et al. | |
| 6,959,075 B2 | 10/2005 | Cutaia et al. | |
| 6,976,055 B1 | 12/2005 | Shaffer et al. | |
| 6,989,856 B2 | 1/2006 | Firestone et al. | |
| 7,003,086 B1 | 2/2006 | Shaffer et al. | |
| 7,007,098 B1 | 2/2006 | Smyth et al. | |
| 7,084,898 B1 | 8/2006 | Firestone et al. | |
| 7,127,487 B1 | 10/2006 | Wang et al. | |
| 7,379,653 B2 | 5/2008 | Yap et al. | |
| 2001/0000540 A1 | 4/2001 | Cooper et al. | |
| 2002/0004841 A1 | 1/2002 | Sawatari | |
| 2002/0010938 A1 * | 1/2002 | Zhang et al. | 725/95 |
| 2002/0087976 A1 | 7/2002 | Kaplan et al. | |
| 2002/0163918 A1 | 11/2002 | Cline | |
| 2003/0025786 A1 | 2/2003 | Norsworthy | |
| 2003/0025832 A1 * | 2/2003 | Swart et al. | 348/461 |
| 2003/0076850 A1 | 4/2003 | Jason, Jr. | |
| 2003/0198195 A1 | 10/2003 | Li | |
| 2003/0231863 A1 * | 12/2003 | Eerenberg et al. | 386/68 |
| 2004/0057449 A1 | 3/2004 | Black | |
| 2004/0165527 A1 | 8/2004 | Gu et al. | |
| 2004/0165710 A1 | 8/2004 | DelHoyo et al. | |
| 2004/0199659 A1 | 10/2004 | Ishikawa et al. | |
| 2004/0213152 A1 | 10/2004 | Matuoka et al. | |
| 2004/0255328 A1 * | 12/2004 | Baldwin et al. | 725/90 |
| 2005/0069102 A1 | 3/2005 | Chang | |
| 2005/0078171 A1 | 4/2005 | Firestone et al. | |
| 2005/0081244 A1 * | 4/2005 | Barrett et al. | 725/97 |
| 2005/0138372 A1 | 6/2005 | Kajihara et al. | |
| 2005/0244137 A1 * | 11/2005 | Takashima et al. | 386/69 |
| 2005/0259803 A1 | 11/2005 | Khartabil | |
| 2006/0020995 A1 * | 1/2006 | Opie et al. | 725/117 |
| 2006/0048193 A1 * | 3/2006 | Jacobs et al. | 725/81 |
| 2006/0104458 A1 | 5/2006 | Kenoyer | |
| 2006/0189337 A1 | 8/2006 | Farrill et al. | |
| 2006/0259755 A1 | 11/2006 | Kenoyer | |
| 2007/0098079 A1 * | 5/2007 | Boyce et al. | 375/240.25 |
| 2007/0110029 A1 | 5/2007 | Gilmore, II et al. | |
| 2007/0123284 A1 | 5/2007 | Schliwa-Bertling et al. | |
| 2007/0133435 A1 | 6/2007 | Eneroth et al. | |

FOREIGN PATENT DOCUMENTS

| | | |
|---|---|---|
| WO | WO 00/19693 A1 | 4/2000 |

OTHER PUBLICATIONS

Joerg Ott et al.; "Extended RTP Profile for RTCP-based feedback (RTP/AVPF)"; Jun. 29, 2002; RCF; pp. 1-43 http://www.ietf.org/proceedings/01dec/I-D/draft-ietf-avt-rtcp-feedback-01.txt.

T. Friedman et al.; "RTP Control Protocol Extended Reports (RTCP XR)"; Network Working Group; Nov. 2003; pp. 1-55 http://www.ietf.org/rfc/rfc3611.txt.

Handley et al. SIP: Session Initiation Protocol. RFC 2543. Mar. 1999. pp. 13 and 14. http://tools.ietf.org/html/rfc2543.

* cited by examiner

SYSTEM AND METHOD FOR FAST START-UP OF LIVE MULTICAST STREAMS TRANSMITTED OVER A PACKET NETWORK

RELATED APPLICATIONS

The present application is related to Ser. No. 09/606,790, filed Jun. 28, 2000, entitled, "Devices and Methods for Minimizing Start Up Delay in Transmission of Streaming Video", now U.S. Pat. No. 7,373,413, which application is assigned to the assignee of the present application.

FIELD OF THE INVENTION

The present invention relates generally to the field of video transmission over digital networks; more specifically, to devices and methods for minimizing startup delays in multicast media streams.

BACKGROUND OF THE INVENTION

In the past few decades, advances in the related fields of video compression and video transmission systems have lead to the widespread availability of digital video programs transmitted over a variety of communication systems and networks. Most recently, new technologies have been developed that have allowed television programs to be transmitted as multicast digital bitstreams of multiplexed video and audio signals delivered to users or client subscribers over packet switched networks.

Digital television signals are typically transmitted over packet networks as MPEG-2 data streams. Each MPEG-2 single program transport stream normally comprises data for a single television programs channel. Each transport stream consists of a set of sub-streams, commonly known as elementary streams, which contain packets of audio, video, or other data information encapsulated in the MPEG-2 stream. Each of these elementary streams has a Packet Identifier (PID) that uniquely identifies that stream within the larger transport stream.

The standard format of a MPEG-2 transport packet is shown in FIG. 5. As can be seen, each transport packet is 188 bytes long and includes a 4-byte header that contains fields for packet synchronization and identification (i.e., a 13-bit PID). The adaptation field carries synchronization and timing information for the decoding and presentation process. The adaptation field may also provide various indicators for random access points of compressed bitstreams and for local program insertion. By way of example, FIG. 6 shows an expanded view of various optional data fields that may be included in the adaptation field. The data portion of the payload may comprise any multimedia data including compressed audio and video streams.

A multiplexer is typically utilized to combine the elementary streams at the studio source or "head-end" of the system to form the overall transport stream. During the multiplexing process additional data, known as service information, is encoded within the transport stream. This service information is contained in a set of database tables that describes the structure of the transport stream. Service information tables commonly found in a DVB transport stream include: the Program Map Table (PMT), which contains the PID for each of the channels associated with a particular program and tells the client receiver which stream contains the MPEG program clock reference for the service; the Network Information Table (NIT), which uniquely identifies the network that is transmitting the transport stream and describes some of the physical properties of the network (e.g., channel frequencies); the Program Association Table (PAT), which contains a complete list of all programs in the transport stream along with the PID for the PMT for program as well as the NIT for the transport stream; and the Conditional Access Table (CAT), which specifies the conditional assess or scrambling systems in use in the transport stream and includes information on how to decode them. Collectively, the PMT, NIT, PAT, and CAT are referred to as Program Specific Information (PSI). The PSI data provides the information that enables automatic configuration of the client receiver in order to demultiplex and decode the various streams of programs. A device and method for de-multiplexing a transport stream which is suitable for fast processing and transmission of transport stream packets of a TV signal is disclosed in U.S. Pat. No. 6,269,107.

One of the requirements for streaming media is that it be played at a constant rate. This means that for streaming media to be transmitted over packet networks strict timing requirements have to be met in order to achieve high-quality media play out. Packet networks, however, typically transmit data asynchronously. This may cause a problem known as network jitter.

Referring to FIG. 1, the problem of network jitter has been addressed for unicast streaming media in the prior art through the use of a de-jitter buffer 17 at the client or receiver 18. A server or proxy 12 transmits data to the receiver 160 through an Internet Protocol (IP) distribution network 13, edge router or switch 14, and a "last mile" network (e.g., DSL) network 15. (In the context of the present application, the terms "router" and "switch" are used synonymously and interchangeably.) The server includes a path for data received from a source, and transmitted to the IP distribution network 13. The de-jitter buffer 17 at receiver 18 first fills up to its fixed size, and then starts playing out. While playing out, the buffer 162 is emptied at the same rate as it is filled. Constrictions in bandwidth affect only the fullness of the buffer, not the play out, therefore overcoming network jitter. The larger the size of the buffer, the more the network jitter phenomenon is abated. However, for streaming applications like audio, delay is introduced by the de-jitter buffer at the receiver end. Moreover, the solution of FIG. 1 does not address startup delays for multicast streaming, or video specific aspects.

IP multicasting is defined as the transmission of an IP datagram (i.e., a data packet formatted according to the Internet protocol) to a "host group", which is a set of zero or more hosts identified by a single IP destination address. A multicast datagram is asymmetrically delivered to all members of its destination host group. The Internet Group Management Protocol (IGMP) is used between IP hosts and their immediate neighbor multicast agents to support the creation of transient groups, the addition and deletion of members of a group, and the periodic confirmation of group membership. Multicast data streams are typical sent using the User Datagram Protocol (UDP), which is implemented in the transport layer and provides a connectionless datagram service for the delivery of packets.

In video streaming applications, in addition to de-jitter buffer delays, there are delays associated with the acquisition of the PSI data, decoder buffer delays (at the receiver end), and delay associated with the acquisition of an Inter-frame of video data. This latter delay is due to the fact that MPEG video streams comprise different types of frames that do not include all of the data to be displayed at any given time. For instance, Inter-frames, or I-frames, are the only type of frame that is not coded with reference to any other frame; P-frames are coded predicatively from a previous I-frame or P-frame;

B-frames are coded predicatively from I-frames and P-frames. In order to be properly decoded, a B-frame associated with a group of pictures ("GOPs") may need to reference the I-frame of a next GOP. (It should be understood that a GOP is an optional structure of an elementary stream. Also, in the context of the present application, the term "I-frame" is intended to broadly refer to an Inter-frame and its equivalents, e.g., an IDR frame in the case of H.264.)

FIG. 2 shows a GOP that consists of 15 frames, wherein the first frame, an I-frame, is fully coded, while the following frames are predicted. Often times, what happens is that the de-jitter and decoder buffers of the receiver end up discarding large amounts of data until it receives all of the necessary information for acquisition, decoding, and displaying a video program.

All of the aforementioned delay factors can add up to a significant startup delay when a user tunes to a live multicast television stream transmitted over a packet network. For example, when a viewer changes a channel, an IGMP LEAVE request is sent by the client receiver to stop receiving the current channel, followed by an IGMP JOIN request to start receiving the new channel. When the new data starts arriving, the client receiver typically tosses out this data until a new I-frame is received. At this point, the de-jitter buffer starts loading until it is sufficiently full, at which time this data is transferred to the receiver's decoder. All of these real-time startup delays considerably lower the viewer's quality of viewing experience during channel changes.

Thus, there remains an unsatisfied need for a solution to the problem of startup delay for multicast streaming of live video programs.

By way of further background, U.S. Pat. No. 6,771,657 teaches a method and apparatus by which MPEG-2 digital television programs may be extracted from a transport stream. U.S. Pat. No. 6,718,553 discloses a system and method for delivery of digital broadcast television programming from a centralized aggregation head-end to subscribers in multiple markets using an interconnected terrestrial fiber optic network. U.S. Pat. No. 6,505,169 teaches a method for adaptive insertion of programs in streaming multimedia content. Additionally, a method for splicing data packets into a pre-existing data stream that complies with the MPEG transmission standard is disclosed in U.S. Pat. No. 5,917,830. Finally, U.S. Pat. No. 6,044,081 teaches a hybrid communications system and multimedia system that allows private network signaling to be routed over a packet network.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DETAILED DESCRIPTION

Figure 1:
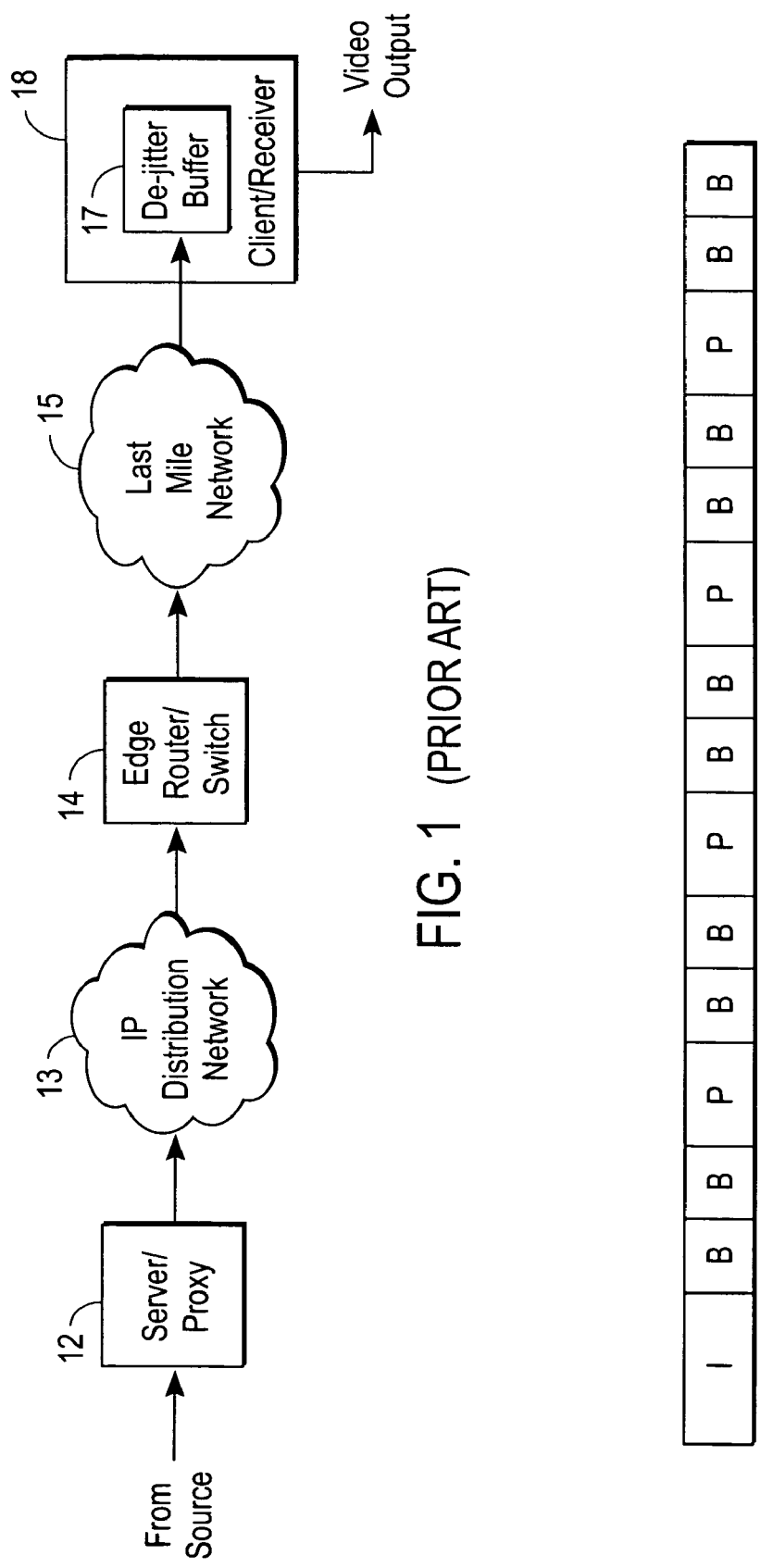
FIG. 1 is a prior art system for unicast streaming media applications.
Figure 2:
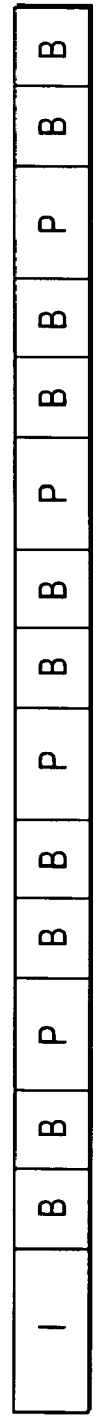
FIG. 2 is a diagram illustrating an exemplary group of fifteen picture frames.

A system and method for fast startup of multicast multimedia streaming is described. In the following description, numerous specific details are set forth, such as device types, protocols, configurations, formats, etc., in order to provide a thorough understanding of the present invention. However, persons having ordinary skill in the networking arts will appreciate that these specific details may not be needed to practice the present invention.

In the context of the present application, it should be understood that a computer network is a geographically distributed collection of interconnected subnetworks for transporting data between nodes, such as intermediate nodes and end nodes. A local area network (LAN) is an example of such a subnetwork; a plurality of LANs may be further interconnected by an intermediate network node, such as a router or switch, to extend the effective "size" of the computer network and increase the number of communicating nodes. Examples of the end nodes may include servers and personal computers. The nodes typically communicate by exchanging discrete frames or packets of data according to predefined protocols. In this context, a protocol consists of a set of rules defining how the nodes interact with each other.

Each node typically comprises a number of basic subsystems including a processor, a main memory and an input/output (I/O) subsystem. Data is transferred between the main memory ("system memory") and processor subsystem over a memory bus, and between the processor and I/O subsystems over a system bus. Examples of the system bus may include the conventional lightning data transport (or hyper transport) bus and the conventional peripheral component interconnect (PCI) bus. The processor subsystem may comprise a single-chip processor and system controller device that incorporates a set of functions including a system memory controller, support for one or more system buses and direct memory access (DMA) engines. In general, the single-chip device is designed for general-purpose use and is not heavily optimized for networking applications.

In a typical networking application, packets are received from a framer, such as an Ethernet media access control (MAC) controller, of the I/O subsystem attached to the system bus. A DMA engine in the MAC controller is provided a list of addresses (e.g., in the form of a descriptor ring in a system memory) for buffers it may access in the system memory. As each packet is received at the MAC controller, the DMA engine obtains ownership of ("masters") the system bus to access a next descriptor ring to obtain a next buffer address in the system memory at which it may, e.g., store ("write") data contained in the packet. The DMA engine may need to issue many write operations over the system bus to transfer all of the packet data.

The present invention defines a network entity, referred to as a Fast Startup Transmitter (FST), which is located in the multicast distribution tree (e.g., on an edge router device). The FST includes one or more Startup Transmit Buffers (STX_BUFs) that function to buffer past packets from one or more multicast streams. In one embodiment, startup transmit buffering of multicast media streams may be implemented as a configured option on network device such as a router or switch. The startup transmit buffers may either be fixed in size, or be of a dynamic size, based on application-specific requirements, and may contain a continuous stream or "sliding window" of prior received multicast information. Alternatively, the startup transmit buffers may contain information deemed important in a piecemeal fashion from received multicast packets according to application specific requirements.

When a client joins the multicast media stream, the FST operates to transmit (e.g., in a burst mode) the transport packets stored in the STX_BUF to the client receiver, which typically comprises a set-top box (STB). The client receiver uses the burst packets to generate a sufficient buffer of information that may be used to quickly start the playout of media content. A STB is an electronic device that is connected to a communication channel, such as a phone, Integrated Services Digital Network (ISDN), Digital Subscriber Line (DSL), or cable television line, and produces output on a conventional television screen. Set-top boxes are commonly used to receive and decode digital television broadcasts. Set-top boxes fall into several categories, from the simplest that receive and unscramble incoming television signals to the more complex that will also function as multimedia desktop computers that can run a variety of advanced services such as videoconferencing, home networking, IP telephony, video-on-demand (VoD) and high-speed Internet TV services.

Practitioners in the media and network arts will appreciate that fast startup transmission of packets in accordance with the present invention overcomes the problems of delay introduced by network jitter, and provides additional information such as encryption data or other system information in a manner that facilitates fast decoding and playback of subsequent media content. The present invention thus solves the problem of channel change latency.

Figure 3:
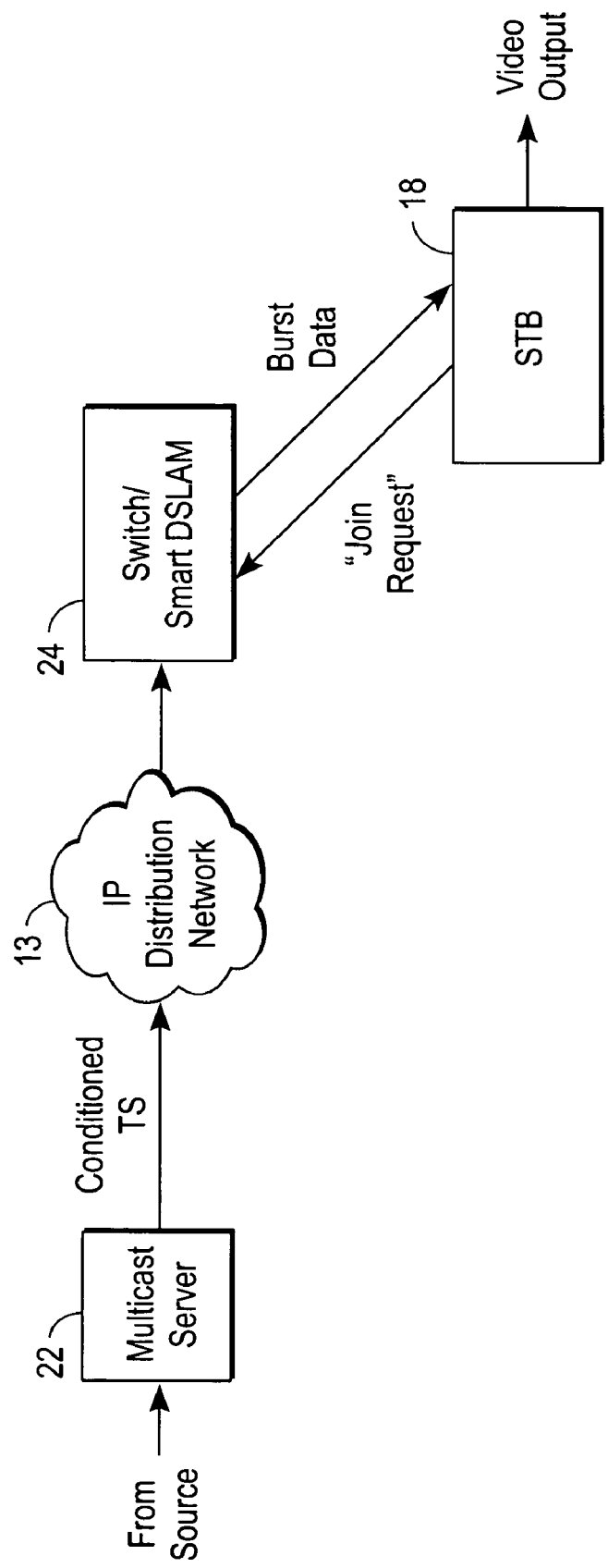
FIG. 3 is a block level diagram of a system for live multicast video streaming with reduced startup delay in accordance with one embodiment of the present invention.

With reference now to FIG. 3, there is shown a system for fast startup of multicast streaming media according to one embodiment of the present invention. In the system of FIG. 3, video programs are created by a source studio that encodes the media content into a MPEG-2 stream, which is subsequently distributed to client users across an IP network 13 via a centralized multicast server 22. For IP network transmission, the MPEG-2 stream is usually encapsulated within Real-Time Transport Protocol (RTP), and/or UDP packets. Multiple MPEG-2 transport packets are typically encapsulated inside of an RTP or UDP packet. A common practice is to set the random access indicator bit in an MPEG-2 packet that contains an I-frame, with sequence header or other necessary header information in the front. When an MPEG-2 packet has the random access indicator bit set, the encapsulation is performed such that it starts at the beginning of the RTP/UDP/IP packet.

It is appreciated that the multimedia content provided by the source may comprise a piecemeal multiplexed digital bitstream that includes runtime encryption information along with PSI data. It is to be further appreciated that the digital video elementary format employed in the system and method of the present invention is not limited to MPEG-2, but may also include MPEG-1, MPEG-4, H.26x, and/or any future video compression standards. That is, the video transport stream shown in the figures and described herein is not limited to MPEG-2 transport. In other words, the present invention has applicability to other types of digital transport streams.

Prior to distribution to the user, a processing function known as random join stream conditioning is performed on the transport stream by multicast server 22 according to one embodiment of the present invention. Server 22 is a network node that typically comprises a generic networked computer platform as described above. In operation, each of the processing functions presently described may be performed by execution of a program of instructions on the processor of a network node or generic server or router which comprises server 22. The purpose of random join stream conditioning is to transpose various packets and provide high-level (e.g., Level 2) marked locations, referred to as Random Join Points (RJPs), in the transport stream where the STX_BUF may start loading or caching data. Basically, when the FST identifies a RJP in the received stream, it starts caching data in the STX_BUF beginning at that point.

Figure 6:
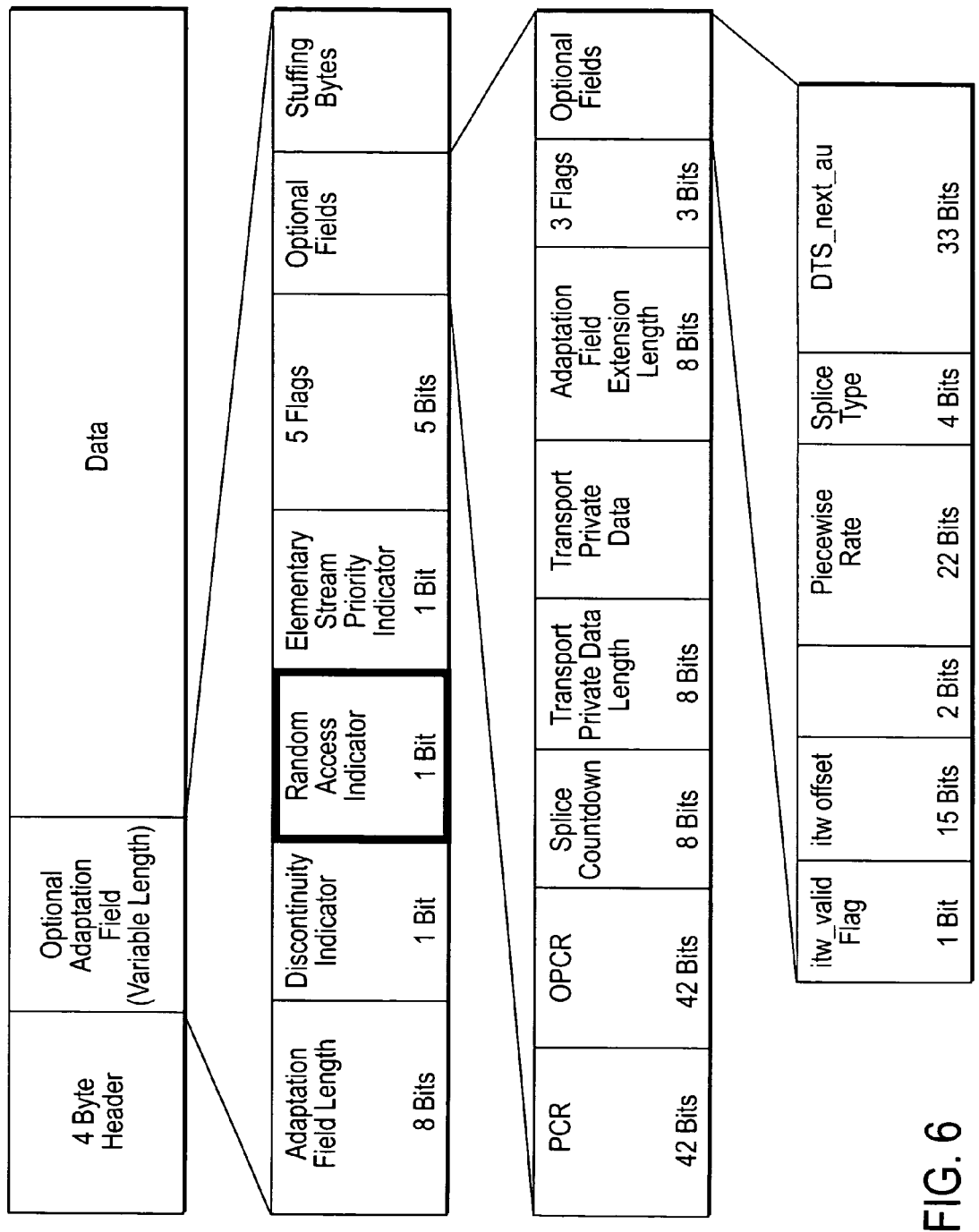
FIG. 6 shows an exemplary expanded adaptation field of a MPEG-2 transport packet.

It should be understood that the RJPs are not the same as the random access indicator bits commonly inserted into the adaptation field of a standard MPEG-2 transport packet at an I-frame boundary (as shown in FIG. 6). Although a MPEG-2 transport stream random access point may sometimes be used as a RJP, typically more information is needed from a client playback device for proper, efficient operation. This additional information may include PSI data, which includes the PAT, PMT, and CAT data tables, as well as encryption data. According to the present invention, the RJP is defined as a point in a transport stream which includes an I-frame boundary, PSI data, and/or other data that a client device needs (e.g., encryption data) to immediately start processing the stream. In certain cases, the elementary stream priority indicator bit (see FIG. 6) may be used by the RJP conditioning function since the elementary stream priority indicator bit typically denotes the start of an I-frame. Other priority fields may also be utilized to create RJPs.

The random join stream conditioning function is typically located at a centralized head-end location, such as multicast server 22; however, it should be understood that the conditioning function may be located at or near other head-end locations (e.g., nodes other than server 22). For instance, the random join stream conditioning function may be located at or near an encoder, a digital turn-around box, or the Transmitting Interworking Unit (TIU), which puts the MPEG-2 broadcast signal into the IP format. The TIU is normally located at the boundary of the MPEG-2 and the IP/Ethernet network, and operates to encapsulate in real time the traffic coming from the MPEG-2 multiplexer into IP datagrams.

It should be further understood that the stream conditioning functional unit may also process the video elementary stream by moving or re-positioning certain packets and pieces of information to optimize the stream for subsequent caching and processing (e.g., decoding) by the client receiver. For example, if dynamic keys are included in the stream for conditional access, these keys may need to be located at or near every RJP, along with the PSI data, in order to achieve optimal playback (i.e., minimal startup delay) at the STB. Therefore, stream conditioning should be understood as broadly referring to the process of trans-positioning packets in the stream, e.g., locating the PAT, PMT, CAT, and encryption key information next to an I-frame.

In the embodiment of FIG. 3, multicast server 22 also performs a random join stream marking (RJSM) function, which marks or signals at a high level (e.g., IP layer) the presence of a RJP in the stream, obviating the need for deep packet inspection by the downstream hardware, i.e., the FST located in an edge router or switch device. In other words, marking the RJP in the stream allows fairly simple, inexpensive hardware to be utilized in the downstream hardware in order to start caching packets. By way of example, for Real-Time Transport Protocol (RTP) streaming, the RJSM may signal an RJP by inserting an RTP-named-signaling event RTP packet, with an RJSM payload-type, at a RJP. Another option is to change an IP header field or RTP header field to signal the presence of a RJP in the stream. It should be understood that the RJSM function may be located in a video streaming device other than multicast server 22; that is, the RJSM function may be located at or near an encoder, a digital turn-around box, or the Transmitting Interworking Unit (TIU).

According to the system architecture shown in FIG. 3, the conditioned transport stream is sent across IP distribution network 13, where it is received by an edge device 24. In one embodiment, edge device comprises either a router, or intelligent switch located just upstream from a Digital Subscriber Line Access Multiplexer (DSLAM). Alternatively, the switch and DSLAM devices may be integrated in a single unit. Such a configuration allows the router or switch to contain one logical interface (and therefore one buffer) for each DSL client endpoint. In the implementation shown, Switch/Smart DSLAM 24 is proxy-joined to every video multicast channel, and receives all channels natively.

Figure 4:
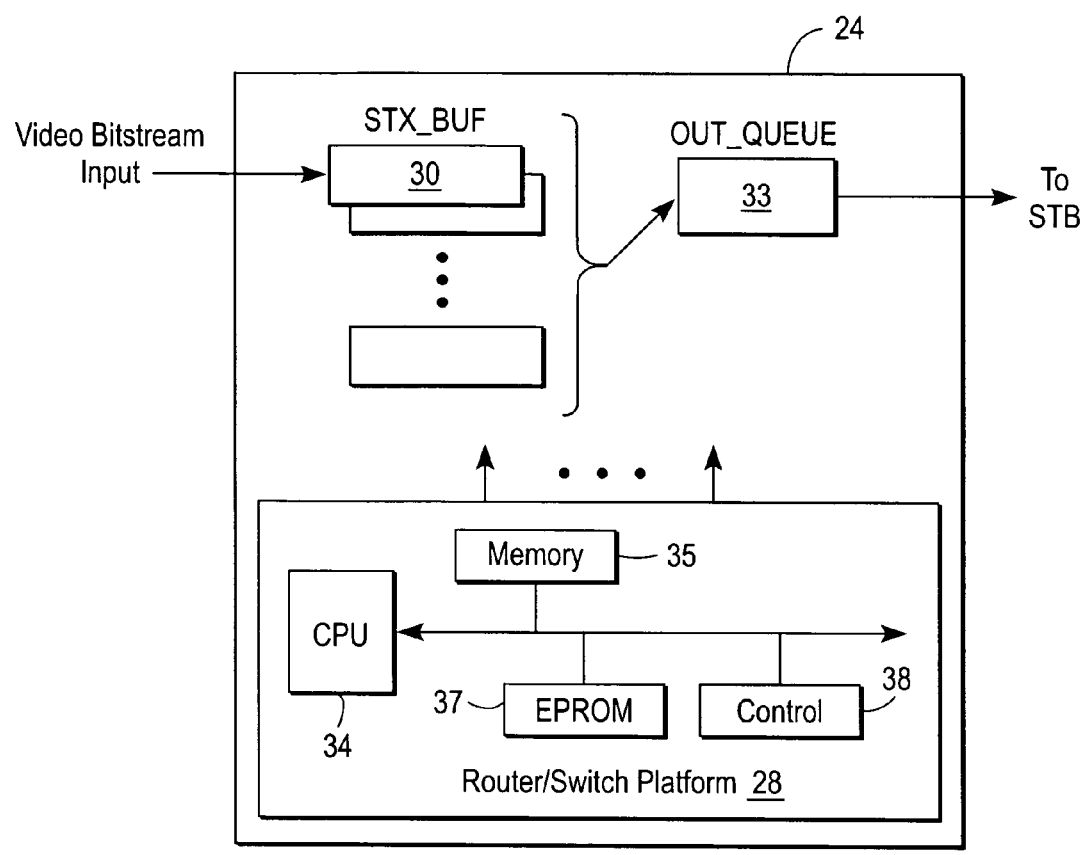
FIG. 4 is a circuit block diagram of a fast startup transmitter utilized in accordance with one embodiment of the present invention.
Figure 5:
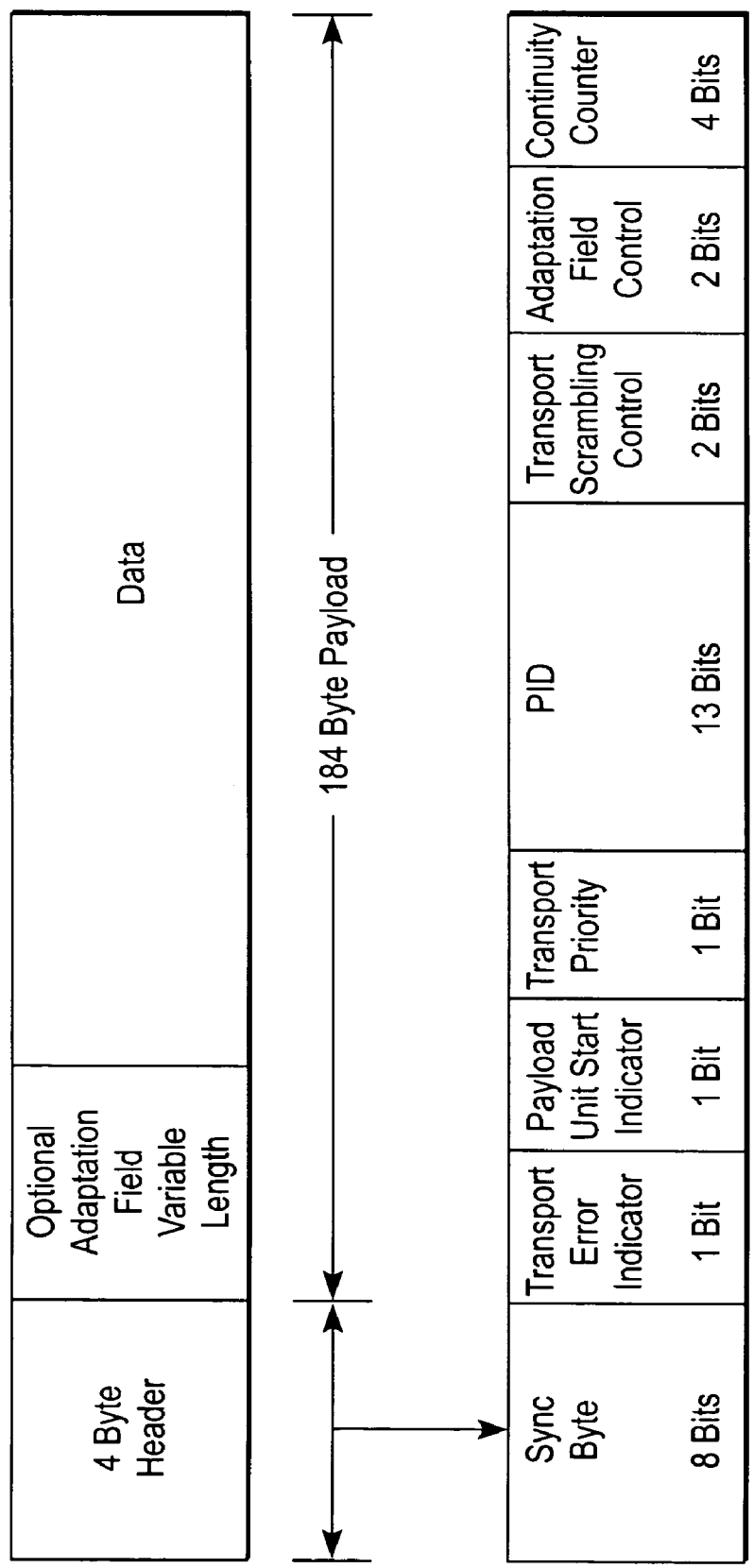
FIG. 5 is a diagram showing the format of a standard MPEG-2 transport packet.

FIG. 4 is a circuit block diagram of device 24 according to one embodiment of the present invention in which the FST function comprises STX_BUF 30 coupled with output queue 33. In the embodiment shown, STX_BUF 30 is made up of multiple circular or dynamic sliding window buffers, each of which caches packets for a different multicast program stream. Data packets for each stream are queued in output queue 33 and then sent off to a number of different clients or groups interested in the media content contained in that particular stream. In a typically implementation, STX_BUF is large enough to buffer hundreds of channels and capable of storing one or more seconds of video data for each channel.

FST device 24 also includes components of a generic router/switch platform 28, consisting of a CPU 34 coupled with a memory 35, EPROM 37, and control hardware 38. In one embodiment, software running on CPU 34 handles the control plane functions of the FST. For instance, upon receiving an IGMP JOIN request from the client receiver (e.g., STB) 18 to start receiving a new channel, CPU 34 signals the STX_BUF to transfer the pre-buffered channel data packets to output queue 33, where they are then sent to the client STB buffer. Data plane processing functions which involve the forwarding of packets are typically performed by control hardware unit 38.

Practitioners in the video streaming arts will appreciate that the FST device 24 dynamically maintains the STX_BUF so that it maintains a minimum number of packets starting with the RJP. Consider the example where STX_BUF needs to maintain a minimum of 300 ms worth of packets, starting at an RJP, where RJPs are present in the stream at regular intervals of every 500 ms. In this case, the STX_BUF needs to support a maximum size of 800 ms of packets. (It should be understood that the translation from time duration to number of packets depends on the video bit-rate. A maximum STX_BUF size of 800 ms amounts to 375 KB of data at a rate of 3.75 Mbps.) Here, a dynamic sliding window update of the STX_BUF size grows from 300 ms to 800 ms. The FST updates the STX_BUF window size when it reaches 800 ms, by discarding the oldest 500 ms of packets past the RJP. After detecting a RJP, the FST adds 300 ms of packets to the STX_BUF before updating the window size.

In networks where there is insufficient bandwidth to burst packets (i.e., the link bandwidth per stream is close to the video bit-rate), the FST may only need to buffer an inter-RJP duration worth of packets, say 500 ms in the present example. In such a scenario, the FST updates the STX_BUF window size each time it detects a RJP, with the window size expanding to 500 ms in duration. Additional heuristics that take into account out-of-order packet intervals may be used to buffer additional packets in the STX_BUF, instead of based strictly on RJPs. Also, sequence number header information may be used to ensure that packets preceding an RJP that arrive out-of-order are included in the STX_BUF.

The foregoing discussion should make apparent the fact that the number of packets buffered behind the RJP may change depending upon a number of application specific considerations, including the bandwidth of the link between edge device 24 and STB 18, as well as the de-jitter and decoding buffering capabilities of STB 18.

In accordance with the present invention, there are several different methods by which packets may be burst from device 24 to the client STB 18. The first burst transfer mechanism is a reliable multicast-like method. In reliable multicast transport layer protocols such as Pragmatic General Multicast (PGM), which runs directly over IP, receivers use negative acknowledgement (NACK) packets to request, from the sender or a Designated Local Repairer (DLR), the retransmission of missing packets. The re-transmit mechanism in the PGM protocol can be used by the FST to burst the STX_BUF packets to the STB client. In such an implementation, the FST of a PGM-enabled router operates like a DLR device, with the client STB requesting retransmission of packets in the STX_BUF as soon as the client joins the multicast stream.

In a second method for transferring packets from the FST to the STB, upon receiving a "JOIN" indication, the FST automatically transmits the string of pre-buffered packets to the multicast group. To avoid excessive bandwidth usage and duplicate packets, the FST may be located at the first hop router or switch. Ideally, where the last mile network is switched or point-to-point, the FST is located at the edge replication point on the edge of distribution network 13. For instance, the FST could be located in a router or intelligent switch just upstream from a Digital Subscriber Line Access Multiplexer (DSLAM), thereby allowing the router or switch to contain one logical interface, and therefore one output buffer, for each DSL client endpoint. FST device 24, on receiving a "JOIN" request from STB 18, queues the STX_BUF packets to the client buffer. Following the initial burst of packets, device 24 operates in normal fashion by replicating any received multicast packets from the joined group to the interested client's STB buffer.

Figure 7:
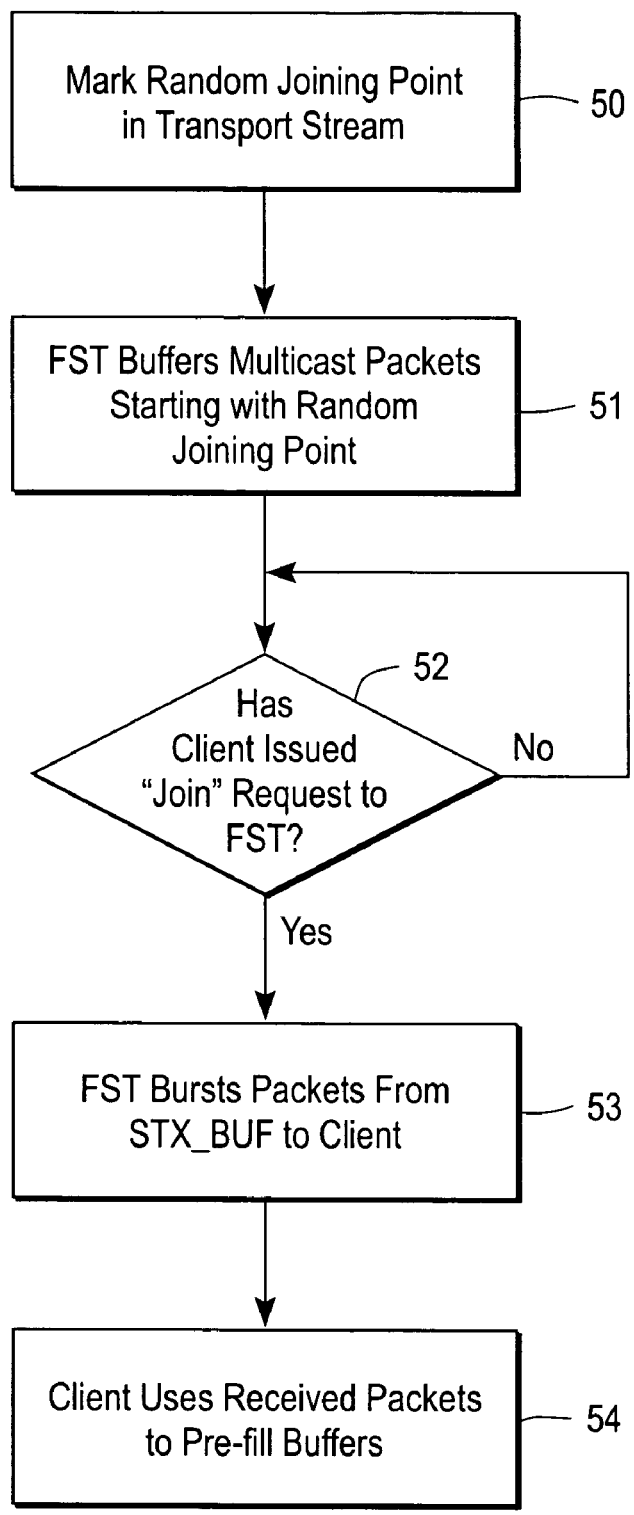
FIG. 7 is a flowchart that illustrates a method for multicast video streaming in accordance with one embodiment of the present invention.

FIG. 7 is a flowchart that illustrates a basic method for multicast video streaming in accordance with one embodiment of the present invention. The method begins at block 50 wherein the RJPs are marked in the digital video transport stream by a head-end conditioning/marking unit. As previously discussed, this function may be performed by a software program running on a CPU of a multicast server. In addition to marking the RJPs, the multicast server may also process the stream to transposition packets to optimize subsequent downstream buffering and fast playout of the video content.

The downstream FST buffers received multicast packets on a per channel basis starting with the RJP (block 51). Thus, pre-join processing includes the steps of conditioning/marking the transport stream, followed by buffering of packets in the FST wherein each STX_BUF maintains a window of current data packets for a distinct channel. In other words, the current content for each channel is pre-buffered by the FST with no upstream IGMP thrashing. This status is maintained until a "JOIN" request has been issued by the client and received by the FST (block 52). During this time, the FST may dynamically update the buffer size. By way of example, for audio content, this may comprise a fixed size sliding window. For video, the STX_BUF may vary in size, such that the buffer starts caching or storing packets at the RJP.

When the client STB issues an IGMP JOIN request to start receiving a new channel, the FST responds by transmitting the pre-buffered channel packets from the STX_BUF to the client STB (block 53). The client STB uses these received packets to pre-fill its de-jitter buffer (and/or possibly its decoder buffer) in order to commence fast start processing of the media content. This is shown occurring at block 54. As described above, packets may be transmitted from the STX_BUF to the client's buffers according to several different methods (e.g., bursting of packets, PGM transmission, etc.). In any of these methods, the packets received by the client STB start with an I-frame and any necessary PSI and encryption information so that there is no discarding of data by the STB, thereby facilitating fast decoding and display of the multimedia programs.

Practitioners in the networking and multicasting arts will appreciated that the embodiments described above are transparent to the client devices. That is, no changes are required to existing client STBs in order to implement the system and methods of the present invention. The present invention is not limited to video applications but may also be useful to other communication technologies.

It should also be understood that elements of the present invention may also be provided as a computer program product which may include a machine-readable medium having stored thereon instructions which may be used to program a computer (or other electronic device) to perform a process. The machine-readable medium may include, but is not limited to, floppy diskettes, optical disks, CD-ROMs, and magneto-optical disks, ROMs, RAMs, EPROMs, EEPROMs, magnet or optical cards, or other type of machine-readable medium suitable for storing electronic instructions. Elements of the present invention may be downloaded as a computer program product, wherein the program may be transferred from a remote computer (e.g., a server) to a requesting computer (e.g., a customer or client device) by way of data signals embodied in a carrier wave or other propagation medium via a communication link (e.g., a modem or network connection).

Furthermore, although the present invention has been described in conjunction with specific embodiments, those of ordinary skill in the computer networking arts will appreciate that numerous modifications and alterations are well within the scope of the present invention. For example, it is appreciated that the video streams of the foregoing description may be either encrypted or unencrypted signals. In the case of encrypted signaling, ordinary encryption/decryption devices may be incorporated into one or more of the devices described above. Accordingly, the specification and drawings are to be regarded in an illustrative rather than a restrictive sense.

We claim:

1. A system for multicast streaming of programs over a packet network comprising:
    a multicast server having a processor that conditions a multicast video bitstream such that packets containing an I-frame are located near program specific information (PSI) packets, the PSI packets include conditional access table (CAT), program association table (PAT), and program map table (PMT) data, the processor marking a random join point (RJP) in the multicast video bitstream immediately preceding the I-frame and the PSI packets, the node outputting the conditioned and marked video bitstream across the packet network; and
    an edge router or switch device of the network that receives the conditioned and marked video bitstream, the edge device including a buffer that caches packets of the conditioned and marked multicast video bitstream starting at the RJP, the edge device sending the cached packets to a client receiver in a multicast group in response to a request received by the edge device from the client receiver.

2. The system of claim 1 wherein the PSI packets further include encryption data.

3. The system of claim 1 wherein the client receiver comprises a set-top box.

4. A method for multicast streaming of programs over a packet network comprising:
    transposing, by a head-end unit, packets of a multicast digital video transport stream such that packets containing an I-frame are located near program specific information (PSI) packets, the PSI packets including conditional access table (CAT), program association table (PAT), and program map table (PMT) data;
    marking, by the head-end unit, a random join point (RJP) in the multicast digital video transport stream immediately preceding the I-frame and PSI packets;
    caching, by a downstream device, packets of the multicast digital video transport stream starting at the RJP; and
    bursting the cached packets to a client device in a multicast group responsive to a request received by the downstream device from the client device.

5. The method of claim 4 wherein the downstream device comprises a router or switch.

6. The method of claim 4 wherein the PSI packets further include encryption data.

7. In a packet-based network for multicast streaming of digital video programs, a computer-implemented method of conditioning a multicast digital video transport stream comprising:
    transposing packets of an elementary stream contained within the multicast digital video transport stream such that packets containing an I-frame are located near program specific information (PSI) packets, the PSI packets including conditional access table (CAT), program association table (PAT), and program map table (PMT) data;
    marking a random join point (RJP) in the multicast digital video transport stream immediately preceding the I-frame and PSI packets; and
    sending the conditioned multicast digital video transport stream across an Internet Protocol (IP) distribution network to a router that is operable to cache a set of current data packets that includes the I-frame and PSI packets for subsequent burst transmission to a client receiver of a multicast group.

8. The method of claim 7 wherein marking comprises inserting a Real-Time Transport Protocol (RTP) signaling event RTP packet in the multicast digital video transport stream.

9. The method of claim 7 wherein marking comprises changing an Internet Protocol (IP) header field to signal the presence of the RJP in the multicast digital video transport stream.

10. The method of claim 7 wherein marking comprises changing an Real-Time Transport Protocol (RTP) header field to signal the presence of the RJP in the multicast digital video transport stream.

11. The method of claim 7 wherein the transposing and marking functions are performed in a multicast server.

12. The method of claim 7 wherein the transposing and marking functions are performed in a Transmitting Interworking Unit (TIU).

13. The method of claim 7 wherein the transposing and marking functions are performed in an encoding device.

* * * * *